(12) United States Patent
Cosarinsky Markman et al.

(10) Patent No.: US 12,710,398 B2
(45) Date of Patent: Aug. 18, 2026

(54) METHOD AND APPARATUS FOR DETERMINING THE SET OF FOCAL LAWS OF A PLURALITY OF FOCAL POINTS LOCATED IN A THREE-DIMENSIONAL TEST OBJECT IN THE PRESENCE OF A COUPLING MEDIUM

(71) Applicant: CONSEJO SUPERIOR DE INVESTIGACIONES CIENTÍFICAS (CSIC), Madrid (ES)

(72) Inventors: Guillermo Cosarinsky Markman, Madrid (ES); Jorge Fernández Cruza, Madrid (ES); Mario Muñoz Prieto, Madrid (ES); Jorge Camacho Sosa Dias, Madrid (ES)

(73) Assignee: CONSEJO SUPERIOR DE INVESTIGACIONES CIENTÍFICAS (CSIC) M, Madrid (ES)

( * ) Notice: Subject to any disclaimer, the term of this patent is extended or adjusted under 35 U.S.C. 154(b) by 393 days.

(21) Appl. No.: 18/493,314

(22) Filed: Oct. 24, 2023

(65) Prior Publication Data

US 2024/0133846 A1 Apr. 25, 2024
US 2024/0230600 A9 Jul. 11, 2024

(30) Foreign Application Priority Data

Oct. 25, 2022 (EP) .................................... 22383027

(51) Int. Cl.

| | |
|---|---|
| ***G01N 29/22*** | (2006.01) |
| ***G01N 29/06*** | (2006.01) |
| ***G01N 29/07*** | (2006.01) |

(52) U.S. Cl.
CPC ......... *G01N 29/221* (2013.01); *G01N 29/069* (2013.01); *G01N 29/07* (2013.01)

(58) Field of Classification Search
CPC .... G01N 29/07; G01N 29/069; G01N 29/221; G01N 29/262; G01N 29/0654; G01N 29/4472; G01N 2291/106

(Continued)

(56) References Cited

U.S. PATENT DOCUMENTS

| | | | | |
|---|---|---|---|---|
| 8,738,339 | B2 | 5/2014 | Richard et al. | |
| 9,500,627 | B2 * | 11/2016 | Fetzer | G01N 29/262 |

OTHER PUBLICATIONS

Guillermo Cosarinsky Markman, "Matrix Array Inspections in NDT: 3D Imaging with the Virtual Array Method", Article, 2022, 1-4, 2022 IEEE International Ultrasonics Symposium.

(Continued)

*Primary Examiner* — John H Le
(74) *Attorney, Agent, or Firm* — Hayes Soloway PC

(57) ABSTRACT

A method for determining the set of focal laws of a plurality of focal points located in a test object includes the steps of providing a bidimensional array of transducer elements in a coupling medium and defining at least a scan line by a set of focal points. For each scan line, the method comprises performing the sub-steps of choosing a two preliminary focal points, calculating a first auxiliary time-of-flight corresponding to the time-of-flight of a wave emitted from the corresponding transducer element and received in the first preliminary focal point, and a second auxiliary time-of-flight corresponding to the time-of-flight of a wave emitted from the same transducer and received in the second preliminary focal point.

8 Claims, 1 Drawing Sheet

(58) Field of Classification Search
USPC ............................................................ 702/39
See application file for complete search history.

(56) References Cited

OTHER PUBLICATIONS

Jorge D. Cruza, "A new beamforming method and hardware architecture for real time two way dynamic depth focusing", Journal, 2019, 1-9, vol. 99, Ultrasonics.

* cited by examiner

METHOD AND APPARATUS FOR DETERMINING THE SET OF FOCAL LAWS OF A PLURALITY OF FOCAL POINTS LOCATED IN A THREE-DIMENSIONAL TEST OBJECT IN THE PRESENCE OF A COUPLING MEDIUM

CROSS-REFERENCE TO RELATED APPLICATIONS AND PRIORITY

This patent application claims priority from European Patent Application No. 22383027.4 filed Oct. 25, 2022. This patent application is incorporated by reference in its entirety.

TECHNICAL FIELD

This invention belongs to the field of ultrasound imaging for three-dimensional bodies submerged in a coupling medium.

State of the Art

Ultrasound imaging is a well-known non-destructive testing (NDT) technique used for inspecting the quality and characteristics of industrial materials. To this end, ultrasound imaging consists of generating ultrasonic waves in the test object to be inspected and sensing the echoes generated by the defects present in said test object.

Typically, ultrasonic waves are emitted by an array of independently controlled transducer elements, and the aforementioned echoes are received by the same transducer elements. A key concept both in emission and reception is the time of flight (TOF) of said ultrasonic waves, which is the propagation time interval of an ultrasonic wave that travels from the transducer element to the focal point of an object or viceversa. The TOF therefore depends on the distance from the transducer to the focal point. In an array of transducers, each one will be at a different distance from the focal point. The focal law for a given focal point is defined as the set comprised by each of the TOFs defined by each transducer element of the array and said focal point.

Contrary to what happens in other fields where ultrasound imaging is applied (e.g., Medicine), in NDT it is customary to have, at least, two mediums wherein ultrasonic waves propagate at different speeds. However, the ultrasonic beam refraction at the interface between the mediums complicates the focal laws calculation, which require iterative algorithms.

This calculation is even more complex when the geometry of the interface changes during the inspection (e.g., in water immersion testing) and a single set of delays is usually not valid for the whole acquisition. In this context, it is defined the term "auto-focusing" as the ability of an ultrasound system for automatically setting the correct focal laws for a given inspection scenario, with less as possible a-priori information.

To complete the scenario of the present technical problem, when a three-dimensional image of the object is aimed, a bi-dimensional array of transducers is needed, since in a three-dimensional image, the echoed waves may not be contained in the same plane of a unidimensional array of transducers.

Several patents disclosed focusing methods and apparatus with matrix arrays. For instance, the American U.S. Pat. No. 8,738,339 B2, "System and Method for ultrasonic testing", discloses a focusing method based on the implementation of a computer-aided-design (CAD) model to compute the focal laws before the inspection takes place. In the European patent EP2294400 B1, "Device and method for the non-destructive testing of objects using ultrasound and the use of matrix phased array probes", a Bezier function is used to approximate the focal laws along the matrix array aperture, so that a number of parameters smaller than the number of array elements is required, and dynamic focusing is achieved by modifying said parameters during the acquisition of the signals in order to adjust the focal laws to the wave propagation.

The field of 3D ultrasound imaging is therefore lacking a method allowing for a faster computation of focal laws when there is a separating medium in between the array transducer and the test object. In particular, in cases where the interface separating said separating medium and the test object changes during the inspection, a fast real-time auto-focusing method is missing for 3D imaging.

DESCRIPTION OF THE INVENTION

The invention provides an alternative solution for this problem by means of a device according to claim 1. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for determining the set of focal laws of a plurality of focal points located in a test object, the method comprising the steps of

- providing a bidimensional or three-dimensional arrangement of transducer elements in a coupling medium, wherein each transducer element is configured to emit and/or receive an ultrasonic wave;
- defining at least a scan line by a set of focal points, each scan line being comprised in the test object, wherein, for each scan line, the method comprises performing the following sub-steps
- choosing a first preliminary focal point and a second preliminary focal point belonging to the set of focal points;

for each transducer element, calculating a first auxiliary time-of-flight corresponding to the time-of-flight of a wave emitted from the corresponding transducer element and received in the first preliminary focal point, and a second auxiliary time-of-flight corresponding to the time-of-flight of a wave emitted from the same transducer and received in the second preliminary focal point, wherein each time-of-flight is calculated by solving the following equation $$t(A, F) = \min\left\{\frac{d(A, E)}{c_1} + \frac{d(E, F)}{c_2}\right\}$$

wherein t(A,F) is the time-of-flight of a wave travelling from the corresponding transducer element to the corresponding preliminary focal point, d(A, E) is the distance between the corresponding transducer element and a corresponding interface point according to Fermat's principle, d(E, F) is the distance between the corresponding interface point and the corresponding preliminary focal point, c1 is the sound speed in the coupling medium and c2 is the sound speed in the test object;

for each transducer element, determining a constant time value and an intermediate variable defined by $$t_K = \frac{d(A, E)}{c_1}\left(1 - \left(\frac{c_1}{c_2}\right)^2\right)$$

Wherein d(A, E) is either d(A, E1) or d(A, E2)

$$\gamma = \frac{c_2^2\left((t(A, F_1) - t_K)^2 - (t(A, F_2) - t_K)^2\right) + (r_2 - r_1)^2}{2(r_2 - r_1)}$$

wherein r1 is the coordinate of the first preliminary focal point measured along the scan line with coordinate origin at the test object surface and r2 is the coordinate of the second preliminary focal point measured along the scan line with coordinate origin at the test object surface calculating, for the rest of the set of focal points of the scan line, the focal laws to each transducer by using the formula $$\tilde{t}(A, P) = t_K + \frac{1}{c_2}\sqrt{(r - r_1 - \gamma)^2 + R_1^2 - \gamma^2}$$

wherein R1=c2·(t(A, F1)−tK), r is the coordinate of the corresponding focal point measured along the scan line with coordinate origin at the test object surface.

With such a method, the time-of-flights of the whole focal points of each scan line may be calculated for each transducer element by only calculating the time-of-flight of two focal points F1 and F2 of each scan line. The rest of the calculations do not involve the solution of complex equations, since they are based on parameters such as the constant time value and the intermediate variable. Therefore, the computing power needed to perform the calculation is much lower than in the known methods.

The fact that the invention defines a bidimensional or three-dimensional arrangement of transducer elements means that the transducer elements are arranged outside a unidimensional line, and can therefore be established in a bidimensional matrix or in any three-dimensional arrangement.

In some particular embodiments, the steps of calculating a first auxiliary time-of-flight and a second auxiliary time-of-flight are carried out using a Gradient Descent method.

This method is used when the convergence probability is low or unknown, since it provides a better convergence ratio. However, it is slower than other methods.

In some particular embodiments, the steps of calculating a first auxiliary time-of-flight and a second auxiliary time-of-flight are carried out using a Multivariate Newton method.

This method is used when the convergence probability is high, since it only converges in a reduced convergence domain. However, it is faster than other methods.

In some particular embodiments, the method further comprises, before the sub-steps, the determination of the geometry of the interface between the coupling medium and the test object by the following steps emitting a plurality of test ultrasonic waves by a plurality of transducer elements of the two-dimensional array, receiving the first echoes of the test ultrasonic waves by a plurality of transducer elements of the two-dimensional array, using the received first echoes to create a plurality of surface points, wherein the steps of emitting the waves, receiving and using the echoes are performed by one of the following techniques: pulse-echo, pitch-catch, or plane wave; and generating a function that fits the surface points, considering this function as the geometry of the interface.

These additional steps are advantageous to calculate the interface surface between the coupling medium and the test object.

In a second inventive aspect, the invention provides an apparatus for generating ultrasound images of a test object, the apparatus comprising a bidimensional array of transducer elements;

an electronic element configured to create ultrasound waves, receive ultrasound echoes and send information related to the ultrasound echoes, the electronic element being associated to the array of transducers;

a first processing element configured to calculate the auxiliary variables according to the corresponding step of a method according to any of the preceding claims by using information related to the ultrasound echoes provided by the electronic element;

a second processing element configured to calculate the focal laws of each pixel of each scan line with respect to each transducer, by using the auxiliary variables provided by the first processing element; and a third processing element configured to calculate pixel values of a three-dimensional image using the information provided by the second processing element.

In some particular embodiments, the first processing element, the second processing element and the third processing element are comprised in a digital hardware element.

In some particular embodiments, the digital hardware element is a portion of the electronic element.

In some particular embodiments, the first processing element, the second processing element and the third processing element are implemented as computer software in an external computer.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
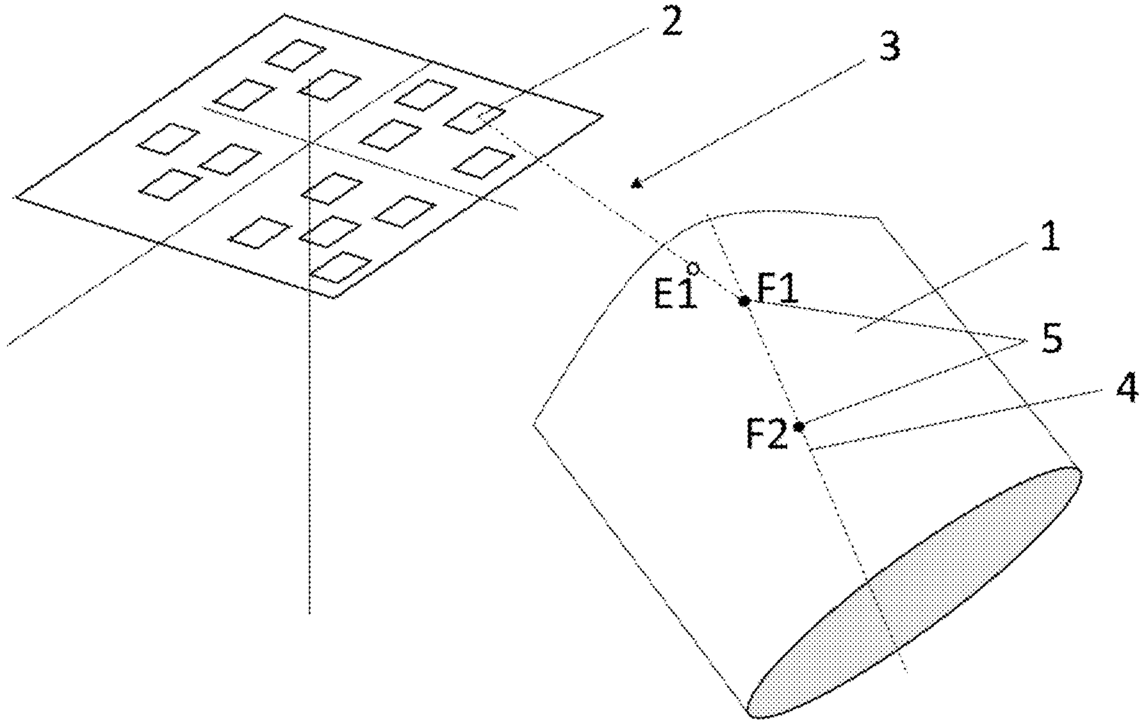
FIG. 1 shows the schematic representation of some steps of the focal law calculation used in a method according to the invention.

In these figures, the following reference numbers have been used:

1 Test object

2 Transducer element

3 Coupling medium

4 Scan line
5 Set of focal points of the scan line
6 Electronic element
7 First processing element
8 Second processing element
9 Third processing element
10 Digital hardware element
F1 First preliminary focal point
F2 Second preliminary focal point
E1 First interface point
E2 Second interface point

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows the schematic representation of some steps of the focal laws calculation used in a method according to the invention.

As may be seen in FIG. 1, there is a coupling medium 3 wherein ultrasonic waves propagate at a first sound speed c1, a test object 1 wherein ultrasonic waves propagate at a second sound speed c2, and an interface between said coupling medium and the test object. There is also a bi-dimensional array comprising N transducer elements 2. This array is situated in the coupling medium. The interface between the coupling medium and the test object is defined by a shape function z=f(x,y).

The transducer elements 2 are configured to perform at least one of emitting an ultrasonic wave to each focal point comprised in the test object or receiving an ultrasonic wave from each focal points 5. Preferably, the transducer elements 2 are configured for both emitting and receiving ultrasonic waves. Concerning focal points, they lie over one or more scan lines 4, so that each line comprises K focal points 5. The geometrical setup is not restricted to two dimensions (i.e., the transducer element 2, the focal point, and the scan line 4 are not required to belong to the same plane).

In this context, according to Fermat's principle, the time-of-flight of an ultrasonic wave that propagates from a transducer element 2 to a focal point (F) is given by the Fermat's principle:

$$t(A, F) = \min\left\{\frac{d(A, E)}{c_1} + \frac{d(E, F)}{c_2}\right\}$$

wherein E is the entry point that indeed minimizes said time-of-flight. Thus, the minimization problem involves all coordinates of the entry point (E) (i.e., in the 3D case E=(xE, yE, f(xE,yE)). Said problem can be solved by performing an iterative search. However, if anyone wants to compute the focal laws for each focal point (F), said computation requires a considerable computational time.

The goal of the method is to simplify the aforementioned time-of-flight computation. To do so, the following substeps will be carried out for each transducer element 2:

Firstly, a first scanline 4 is defined. For this scanline 4, two auxiliary times-of-flight will be computed for two arbitrary focal points lying over said scan line 4: a fist auxiliar focal point F1 and a second auxiliar focal point F2. These computations will be performed by solving the aforementioned equation for the time-of-flight, but only for these two auxiliary focal points. Depending on the convergence domain of each situation, either a Gradient Descent Method (indicated for unknown or low convergence) or a Multivariate Newton Method (indicated for certain convergence) will be used. Hence, a first auxiliar TOF (TOF(A,F1)) and a second auxiliar (TOF(A,F2)) are obtained.

Once that the two times-of-flight have been obtained, the times-of-flight of the rest of the focal points of the scan line will be obtained. However, the Fermat's principle will not be used for this purpose, since it would be computationally demanding.

Instead of this method, a constant time value and an intermediate variable will be defined for the whole scanline (i.e., it is calculated only once for each scanline, there is no need to calculate each variable for each focal point of the scanline):

$$t_K = \frac{d(A, E)}{c_1}\left(1 - \left(\frac{c_1}{c_2}\right)^2\right)$$

Wherein d(A, E) is either d(A, E1) or d(A, E2)

$$\gamma = \frac{c_2^2\left((t(A, F_1) - t_K)^2 - (t(A, F_2) - t_K)^2\right) + (r_2 - r_1)^2}{2(r_2 - r_1)}$$

wherein r1 is the coordinate of the first preliminary focal point F1 measured along the scan line with coordinate origin at the test object surface r2 is the coordinate of the second preliminary focal point F2 measured along the scan line with coordinate origin at the test object.

Once that these parameters have been calculated for the scanline, for the rest of the set of focal points of the scan line 4, the focal laws to each transducer 2 by using the formula $$\tilde{t}(A, P) = t_K + \frac{1}{c_2}\sqrt{(r - r_1 - \gamma)^2 + R_1^2 - \gamma^2}$$

wherein R1=c2·(t(A, F1)−tK), r is the coordinate of the corresponding focal (F) point measured along the scan line with coordinate origin at the test object surface.

As a result, the problem of determining the focal laws used for focusing in 3D ultrasound imaging in the presence of interface is reduced to a closed formula with simple arithmetic operations. Therefore, for a scan line with K focal points 5, instead of K iterative searches of the entry points, only two are needed (those for the first auxiliar point F1 and the second auxiliar focal point F2). Thus, a K/2 reduction of the number of iterative searches is obtained with the virtual approach, which can typically reduce the computation time in one or two orders of magnitude.

When necessary, the method further comprises the step of determining the shape of the interface, so that the computation of the focal laws takes into account the possible changes in the geometry of said interface (e.g., in water immersion testing). To this end, before computing the auxiliar TOFs, the shape of the interface is determined from the reception of one or more ultrasonic waves in the 2D array, wherein said ultrasonic waves correspond to the reflection in the interface of one or more ultrasonic waves previously emitted by the 2D array.

In the end, a set of surface points is estimated from the pulse-echo acquisition. This set of points is then fitted with a function, so an analytic expression is obtained to solve the iterative searches required for the computation of the axillar TOFs. Alternatively, a discrete representation of the surface can be obtained by 2D interpolation of the sampled points, and discrete approximation of local derivatives can be used during the virtual array calculation process.

Figure 2:
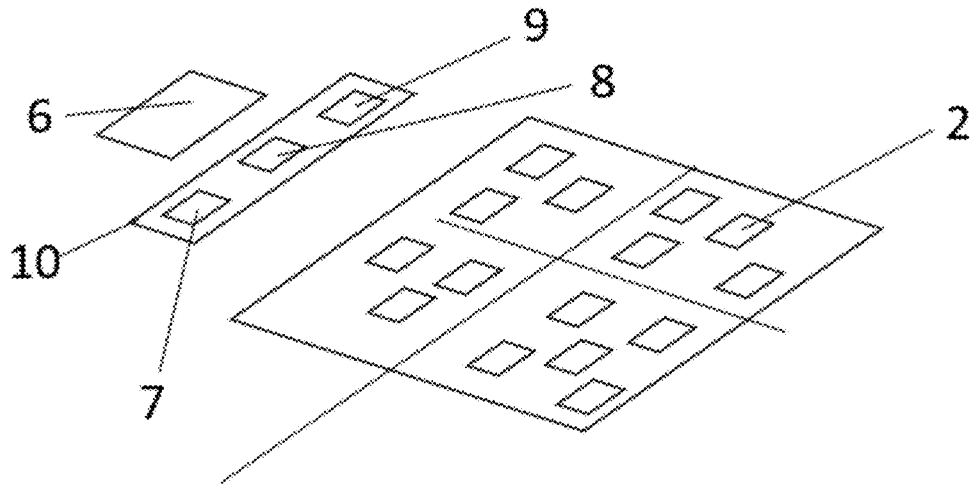
FIG. 2 shows a particular embodiment of an apparatus for generating ultrasound images of a test object using a bidimensional array of elements according to the invention.

FIG. 2 shows a particular embodiment of an apparatus for generating ultrasound images of a test object using a bidimensional array of elements. This apparatus comprises a bidimensional array of transducer elements 2, and an electronic element 6 able excite the transducer elements 2 to create ultrasound waves, to receive the ultrasound echoes generated from the wave propagation and arriving to each transducer element 2 and a set of processing elements to implement the imaging method.

A first processing element 7 is configured to calculate the auxiliary variables according to the corresponding step of a method as described above, by using the information related to the ultrasound echoes provided by the electronic element 6. In some particular embodiment, the geometry of the surface is estimated by this element from a set of emitted and received signals, before calculating the auxiliary variables.

A second processing element 8 is configured to calculate the focal laws of each pixel of each scan line with respect to each transducer, by using the auxiliary variables provided by the first processing element 7.

A third processing element 9 is configured to calculate pixel values of a three-dimensional image using the information provided by the second processing element 8.

In this case, the first processing element 7, the second processing element 8 and the third processing element 9 are comprised in a digital hardware element 10. In some cases, the digital hardware element 10 may be a portion of the electronic element 6.

In some particular embodiments, the first processing element, the second processing element and the third processing element are implemented as computer software in an external computer.

The invention claimed is:

1. A method for determining the set of focal laws of a plurality of focal points located in a test object, the method comprising the steps of:

providing a bidimensional or three-dimensional arrangement of transducer elements in a coupling medium, wherein each transducer element is configured to emit and/or receive an ultrasonic wave;

defining at least a scan line by a set of focal points, each scan line being comprised in the test object, wherein, for each scan line, the method comprises performing the following sub-steps choosing a first preliminary focal point and a second preliminary focal point belonging to the set of focal points;

for each transducer element, calculating a first auxiliary time-of-flight corresponding to the time-of-flight of a wave emitted from the corresponding transducer element and received in the first preliminary focal point, and a second auxiliary time-of-flight corresponding to the time-of-flight of a wave emitted from the same transducer and received in the second preliminary focal point, wherein each time-of-flight is calculated by solving the following equation $$t(A, F) = \min\left\{\frac{d(A, E)}{c_1} + \frac{d(E, F)}{c_2}\right\}$$

wherein t(A,F) is the time-of-flight of a wave travelling from the corresponding transducer element to the corresponding preliminary focal point, d(A, E) is the distance between the corresponding transducer element and a corresponding interface point according to Fermat's principle, d(E, F) is the distance between the corresponding interface point and the corresponding preliminary focal point, c1 is the sound speed in the coupling medium and c2 is the sound speed in the test object;

for each transducer element, determining a constant time value (tK) and an intermediate variable (γ) defined by $$t_K = \frac{d(A, E)}{c_1}\left(1 - \left(\frac{c_1}{c_2}\right)^2\right)$$

Wherein d(A, E) is either d(A, E1) or d(A, E2)

$$\gamma = \frac{c_2^2\left((t(A, F_1) - t_K)^2 - (t(A, F_2) - t_K)^2\right) + (r_2 - r_1)^2}{2(r_2 - r_1)}$$

wherein r1 is the coordinate of the first preliminary focal point measured along the scan line with coordinate origin at the test object surface and r2 is the coordinate of the second preliminary focal point measured along the scan line with coordinate origin at the test object surface;

calculating, for the rest of the set of focal points of the scan line (4), the focal laws to each transducer (A) by using the formula $$\tilde{t}(A, P) = t_K + \frac{1}{c_2}\sqrt{(r - r_1 - \gamma)^2 + R_1^2 - \gamma^2}$$

wherein R1=c2·(t(A, F1)−tK), r is the coordinate of the corresponding focal point measured along the scan line (4) with coordinate origin at the test object surface.

2. The method according to claim 1, wherein the steps of calculating a first auxiliary TOF and a second auxiliary time-of-flight are carried out using a Gradient Descent method.

3. The method according to claim 1, wherein the steps of calculating a first auxiliary TOF and a second auxiliary time-of-flight are carried out using a Multivariate Newton method.

4. The method according to claim 1, wherein the method further comprises, before the sub-steps, the determination of the geometry of the interface between the coupling medium and the test object by the following steps:

emitting a plurality of test ultrasonic waves by the plurality of transducer elements, receiving the first echoes of the test ultrasonic waves by the plurality of transducer elements, using the received first echoes to create a plurality of surface points, wherein the steps of emitting the waves, receiving and using the echoes are performed by one of the following techniques: pulse-echo, pitch-catch, or plane wave; and generating a function that fits the surface points, considering this function as the geometry of the interface.

5. An apparatus for generating ultrasound images of a test object, the apparatus comprising a bidimensional array of transducer elements;

an electronic element configured to create ultrasound waves, receive ultrasound echoes and send information related to the ultrasound echoes, the electronic element being associated to the array of transducers;

a first processing element configured to calculate the auxiliary variables according to the corresponding calculating step of the method according to claim 1 by using information related to the ultrasound echoes provided by the electronic element;

a second processing element configured to calculate the focal laws of each pixel of each scan line with respect to each transducer, by using the auxiliary variables provided by the first processing element; and a third processing element configured to calculate pixel values of a three-dimensional image using the information provided by the second processing element.

6. The apparatus according to claim 5, wherein the first processing element, the second processing element and the third processing element are comprised in a digital hardware element.

7. The apparatus according to claim 5, wherein the digital hardware element is a portion of the electronic element.

8. The apparatus according to claim 5, wherein the first processing element, the second processing element and the third processing element are implemented as computer software in an external computer.

* * * * *